United States Patent
Akkarakaran et al.

(10) Patent No.: US 11,088,736 B2
(45) Date of Patent: *Aug. 10, 2021

(54) PRECODING REFERENCE SIGNALS FOR UPLINK TRANSMISSION WITH DOWNLINK INTERFERENCE INFORMATION

(71) Applicant: QUALCOMM Incorporated, San Diego, CA (US)

(72) Inventors: Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/795,925

(22) Filed: Feb. 20, 2020

(65) Prior Publication Data

US 2020/0195318 A1 Jun. 18, 2020

Related U.S. Application Data

(63) Continuation of application No. 16/059,603, filed on Aug. 9, 2018, now Pat. No. 10,594,371.

(Continued)

(51) Int. Cl.
*H04L 5/12* (2006.01)
*H04B 7/0456* (2017.01)
(Continued)

(52) U.S. Cl.
CPC ......... *H04B 7/0456* (2013.01); *H04B 7/0421* (2013.01); *H04B 7/0469* (2013.01);
(Continued)

(58) Field of Classification Search
CPC .. H04B 7/0456; H04B 17/345; H04B 7/0469; H04B 7/0626; H04L 5/0048;
(Continued)

(56) References Cited

U.S. PATENT DOCUMENTS 10,594,371 B2   3/2020   Akkarakaran et al.
2009/0046800 A1   2/2009   Xu et al.
(Continued)

FOREIGN PATENT DOCUMENTS

CN   1697361 A   11/2005
CN   102244557 A   11/2011
(Continued)

OTHER PUBLICATIONS

International Search Report and Written Opinion—PCT/US2018/046197—ISA/EPO—dated Nov. 12, 2018.
(Continued)

*Primary Examiner* — Helene E Tayong
(74) *Attorney, Agent, or Firm* — Qualcomm Incorporated

(57) ABSTRACT

Certain aspects of the present disclosure relate to methods and apparatus relating to precoding reference signals for uplink transmissions with downlink interference information. In certain aspects, a method, performed by a user equipment (UE) includes receiving, from a base station, one or more signals for use in estimating channel quality for a downlink between the base station and the UE. The method also includes determining a first frequency resource and a second frequency resource from a frequency band allocated for transmitting a reference signal (RS). The method further includes computing a first downlink channel quality estimate for the first frequency resource using the one or more signals, transmitting a first RS precoded using the first downlink channel quality estimate, computing a second downlink channel quality estimate for the second frequency resource using the one or more signals and transmitting a second RS precoded using the second downlink channel quality estimate.

30 Claims, 8 Drawing Sheets

Related U.S. Application Data

(60) Provisional application No. 62/544,417, filed on Aug. 11, 2017.

(51) Int. Cl.
    *H04W 72/12*      (2009.01)
    *H04W 72/04*      (2009.01)
    *H04B 7/0417*     (2017.01)
    *H04L 5/00*       (2006.01)
    *H04B 17/345*     (2015.01)
    *H04B 7/06*       (2006.01)
    *H04L 25/02*      (2006.01)
    *H04W 72/08*      (2009.01)

(52) U.S. Cl.
    CPC ......... *H04B 7/0626* (2013.01); *H04B 17/345* (2015.01); *H04L 5/0048* (2013.01); *H04L 25/0224* (2013.01); *H04W 72/042* (2013.01); *H04W 72/0413* (2013.01); *H04W 72/0453* (2013.01); *H04W 72/082* (2013.01); *H04W 72/1268* (2013.01); *H04W 72/1294* (2013.01)

(58) Field of Classification Search
    CPC .......... H04L 25/0224; H04W 72/0413; H04W 72/042; H04W 72/0453; H04W 72/082; H04W 72/1268; H04W 72/1294
    USPC ........................................................ 375/262
    See application file for complete search history.

(56) References Cited

U.S. PATENT DOCUMENTS

| | | |
|---|---|---|
| 2010/0002649 A1 | 1/2010 | Teo et al. |
| 2010/0246512 A1* | 9/2010 | Kawamura ......... H04L 25/0228 370/329 |
| 2010/0265901 A1 | 10/2010 | Koo et al. |
| 2013/0250882 A1 | 9/2013 | Dinan |
| 2014/0112168 A1 | 4/2014 | Chen et al. |
| 2016/0119936 A1 | 4/2016 | Kim et al. |
| 2017/0111895 A1 | 4/2017 | Tiirola et al. |
| 2017/0311321 A1 | 10/2017 | Kakishima et al. |
| 2018/0027580 A1 | 1/2018 | Yoo et al. |
| 2019/0007181 A1 | 1/2019 | Marinier et al. |

FOREIGN PATENT DOCUMENTS

| | | |
|---|---|---|
| CN | 102362441 A | 2/2012 |
| CN | 102594491 A | 7/2012 |
| WO | 2014065850 A1 | 5/2014 |
| WO | 2016047409 A1 | 3/2016 |
| WO | 2016114696 A1 | 7/2016 |
| WO | 2017135852 A1 | 8/2017 |

OTHER PUBLICATIONS

Sun F., et al., "Designs of Precoding for LTE TDD Using Cell Specific Reference Signals", IEEE Globecom 2010 Workshop on Broadband Wireless Access, Radio Access Technology Section, Aalborg University, Communication Theory Lab, Royal Institute of Technology, pp. 871-875.

* cited by examiner

PRECODING REFERENCE SIGNALS FOR UPLINK TRANSMISSION WITH DOWNLINK INTERFERENCE INFORMATION

CROSS-REFERENCE TO RELATED APPLICATIONS

This application is continuation of U.S. application Ser. No. 16/059,603, entitled "PRECODING REFERENCE SIGNALS FOR UPLINK TRANSMISSION WITH DOWNLINK INTERFERENCE INFORMATION," which was filed Aug. 9, 2018, and which claims the benefit of U.S. Provisional Application Ser. No. 62/544,417 entitled "PRECODING REFERENCE SIGNALS FOR UPLINK TRANSMISSION WITH DOWNLINK INTERFERENCE INFORMATION," which was filed Aug. 11, 2017. Each of the aforementioned applications is herein incorporated by reference in its entirety.

FIELD

The present disclosure relates generally to communication systems, and more particularly, to methods and apparatus relating to precoding reference signals for uplink transmission with downlink interference information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a user equipment (UE). The method generally includes receiving, from a base station, one or more signals for use in estimating channel quality for a downlink between the base station and the UE, determining a first frequency resource and a second frequency resource from a frequency band allocated for transmitting a reference signal (RS), computing a first downlink channel quality estimate for the first frequency resource using the one or more signals, transmitting a first RS precoded using the first downlink channel quality estimate, computing a second downlink channel quality estimate for the second frequency resource using the one or more signals, and transmitting a second RS precoded using the second downlink channel quality estimate.

Also described herein are embodiments of an apparatus comprising a non-transitory memory comprising executable instructions and a processor in data communication with the memory and configured to execute the instructions to cause the apparatus to receive, from a base station, one or more signals for use in estimating channel quality for a downlink between the base station and the apparatus, determine a first frequency resource and a second frequency resource from a frequency band allocated for transmitting a reference signal (RS), compute a first downlink channel quality estimate for the first frequency resource using the one or more signals, transmit a first RS precoded using the first downlink channel quality estimate, compute a second downlink channel quality estimate for the second frequency resource using the one or more signals, and transmit a second RS precoded using the second downlink channel quality estimate.

Also described herein are embodiments of an apparatus means for receiving, from a base station, one or more signals for use in estimating channel quality for a downlink between the base station and the apparatus, means for determining a first frequency resource and a second frequency resource from a frequency band allocated for transmitting a reference signal (RS), means for computing a first downlink channel quality estimate for the first frequency resource using the one or more signals, means for transmitting a first RS precoded using the first downlink channel quality estimate, means for computing a second downlink channel quality estimate for the second frequency resource using the one or more signals, and means for transmitting a second RS precoded using the second downlink channel quality estimate.

Also described herein are embodiments of a non-transitory computer readable medium comprising instructions to be executed in an apparatus, wherein the instructions when executed in the apparatus perform a method, where the method includes receiving, from a base station, one or more signals for use in estimating channel quality for a downlink between the base station and a UE, determining a first frequency resource and a second frequency resource from a frequency band allocated for transmitting a reference signal (RS), computing a first downlink channel quality estimate for the first frequency resource using the one or more signals, transmitting a first RS precoded using the first downlink channel quality estimate, computing a second downlink channel quality estimate for the second frequency resource using the one or more signals, and transmitting a second RS precoded using the second downlink channel quality estimate.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
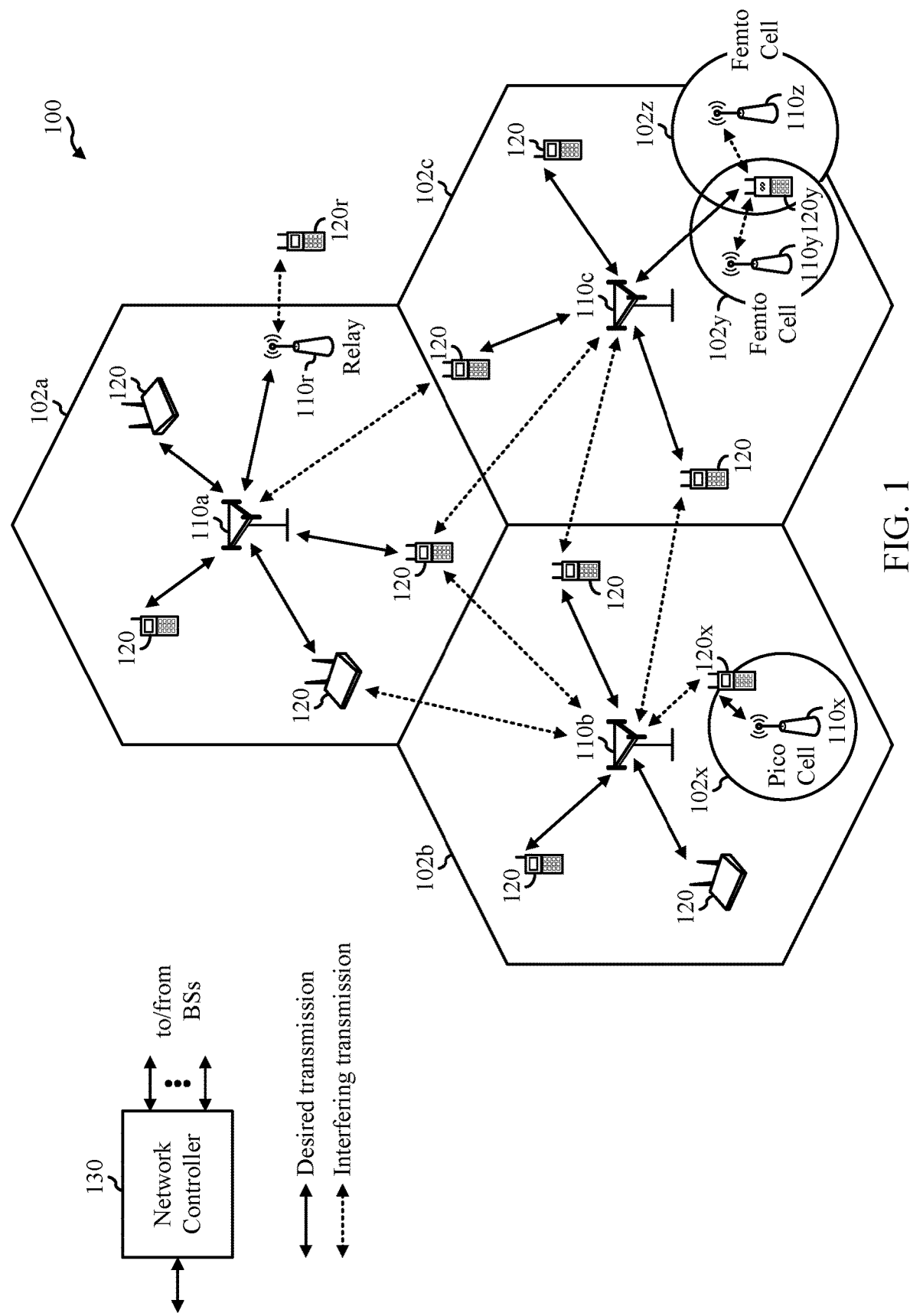
FIG. 1 is a block diagram conceptually illustrating an example telecommunications system, in accordance with certain aspects of the present disclosure.

Aspects of the present disclosure relate to methods and apparatus relating to precoding reference signals for uplink transmission with downlink interference information.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

A user equipment (UE), such as one conforming to the NR wireless communications standards, may transmit one or more sounding reference signals (SRS) on the uplink to a base station (e.g., gNB) to enable the base station to estimate the uplink channel quality over a portion of the channel bandwidth over which the SRS is transmitted by the UE. Further, the UE may separately transmit information indicative of an estimate of downlink channel quality to the base station. For example, after receiving a reference signal (e.g., CRS (cell-specific reference signal), CSI-RS (channel state information-reference signal), ZP-CSI-RS (zero-power CSI-RS), etc.), the UE may estimate the downlink channel quality based on the reference signal and transmit information back to the BS that is indicative of such an estimation. In some cases, in order to utilize less resources on the uplink for transmitting SRS and information indicative of the estimate of downlink channel quality to the base station, in certain aspects, the SRS may be coded (e.g., precoded) with information indicative of the estimate of downlink channel quality. An example of information indicative of the estimate of downlink channel quality is an $R_{nn}$ matrix, which is the interference covariance matrix across receive antennas at the UE based on the signals received by the UE on the downlink.

For example, the $R_{nn}$ matrix may be applied by a precoder to the SRS prior to the SRS transmission. In some cases, to pre-code the SRS with information indicative of the estimate of downlink channel quality (e.g., $R_{nn}$ matrix), a pre-whitened SRS is used. A pre-whitened SRS is an example of when a pre-coder applies an operation, such as sqrt(inv($R_{nn}$)), to the SRS, in which case the $R_{nn}$ may first need to be computed over the entire bandwidth over which SRS is transmitted and, then, the square root of the inverse of the $R_{nn}$ may be applied to the SRS sequence. However, pre-whitening the SRS involves an extra level of computational complexity including computing $R_{nn}$ and applying the inverse of $R_{nn}$ to the SRS sequence, which may take time/compute cycles to process.

Accordingly, certain embodiments discussed herein relate to a multi-stage $R_{nn}$ feedback mechanism whereby the UE computes an $R_{nn}$ over only a portion (e.g., subband) of the frequency band (e.g., bandwidth) used for transmitting a SRS transmission. By implementing the embodiments described herein, less time and compute cycles are used when SRS is pre-coded with information indicative of the estimate of downlink channel quality (e.g., $R_{nn}$ matrix).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

EXAMPLE WIRELESS COMMUNICATIONS SYSTEM

FIG. 1 illustrates an example wireless network 100, such as a new radio (NR) or 5G network, in which aspects of the present disclosure may be performed. For example, base station (BS) 110 may transmit one or more signals to a user equipment (UE) 120 for use in computing a downlink channel quality estimate for a downlink of the UE, based on which the UE 120 may code one or more reference signals with downlink channel quality that is computed and transmit the one or more coded reference signals back to the BS 110 (e.g., operations 800 of FIG. 8).

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. ABS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
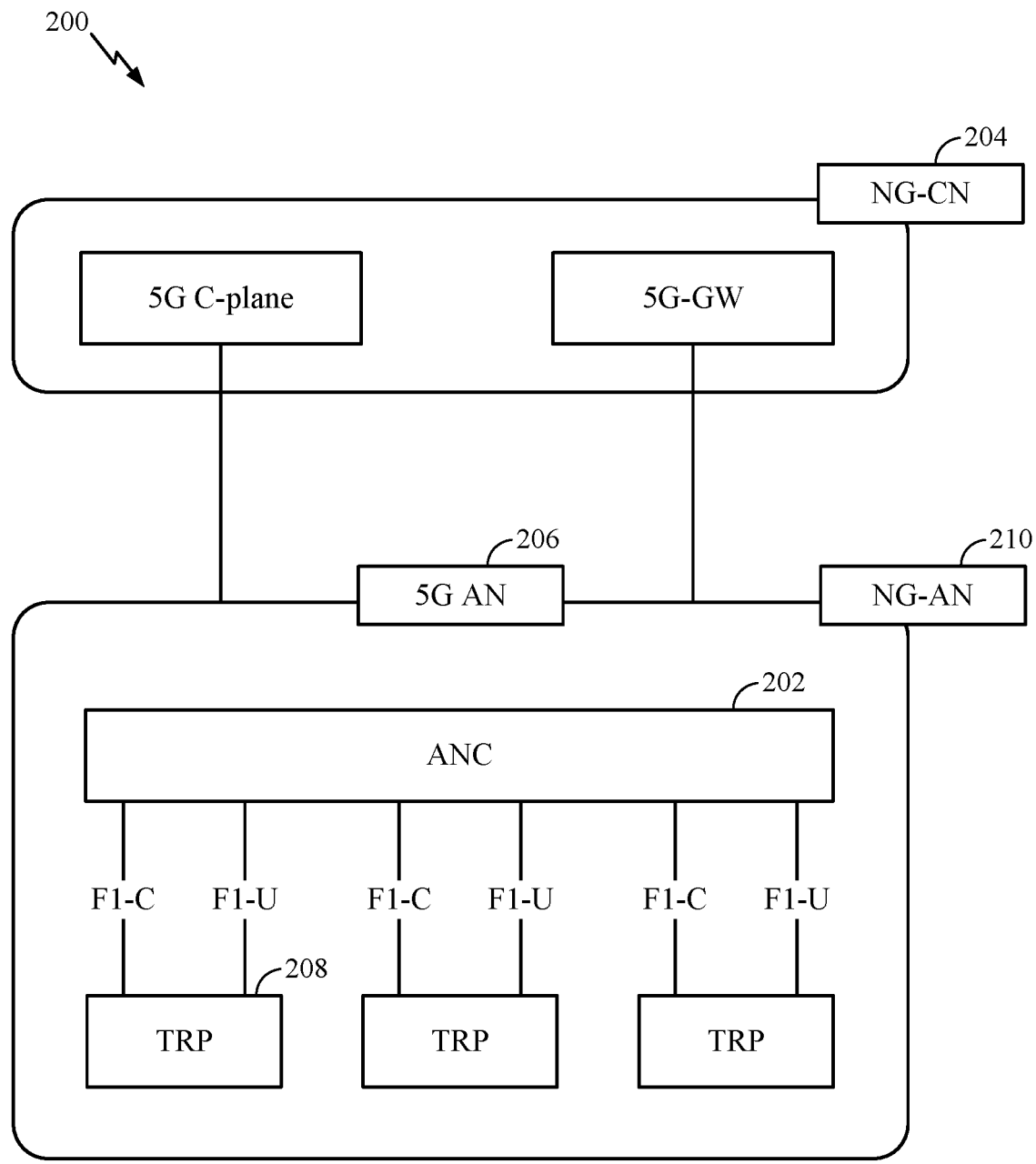
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200.

As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
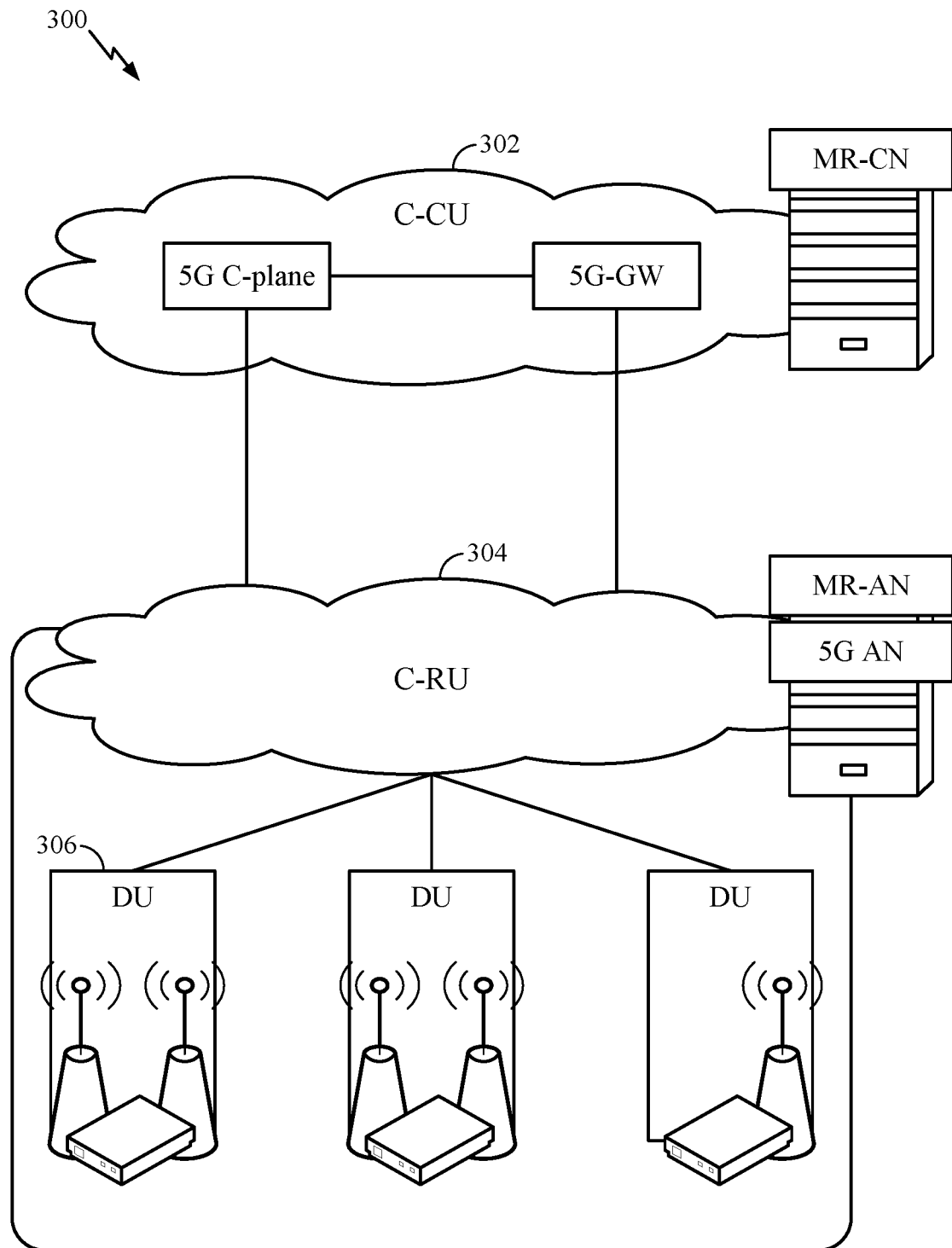
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
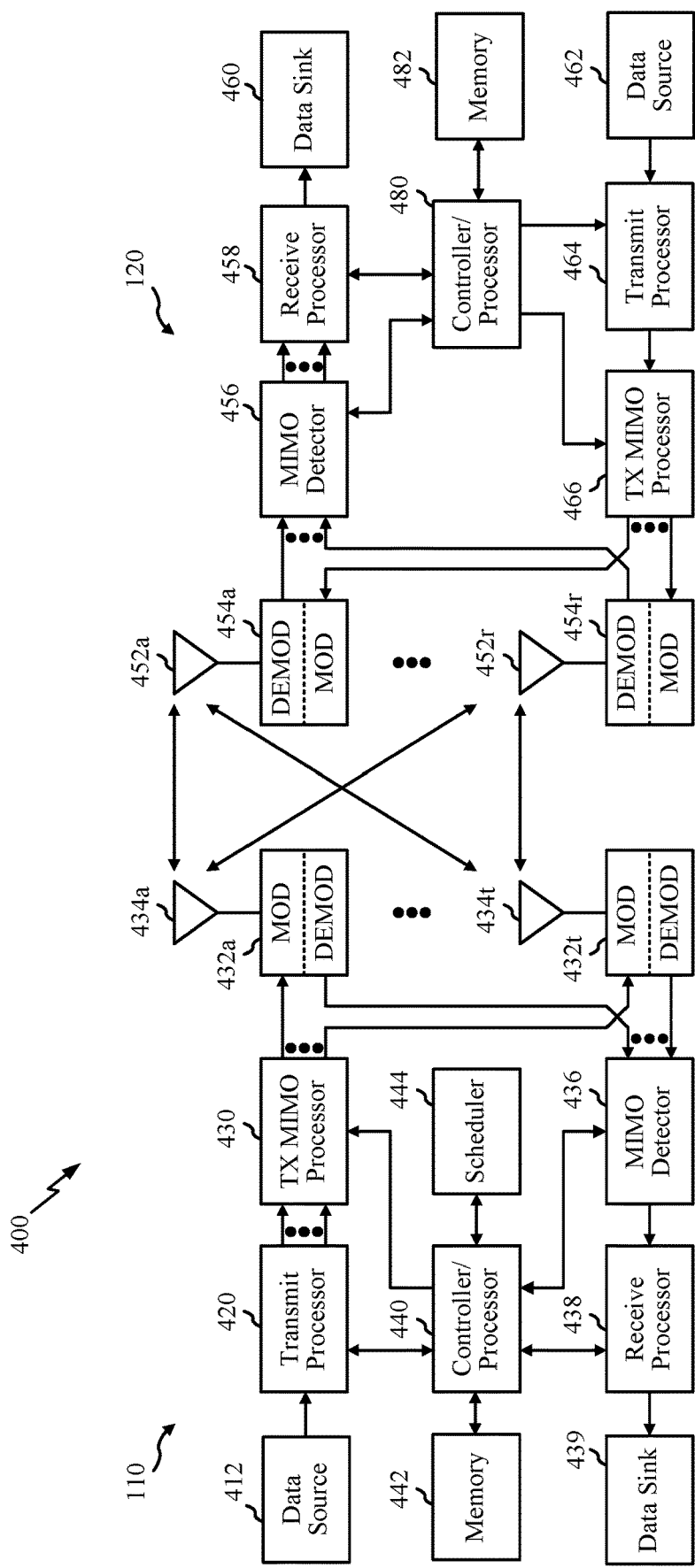
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein (e.g., operations 800 of FIG. 8).

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of certain processes for the techniques described herein. The processor 480 and/or other processors and modules at the UE 120 may also perform or direct, e.g., the execution of the functional blocks illustrated in FIG. 8, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
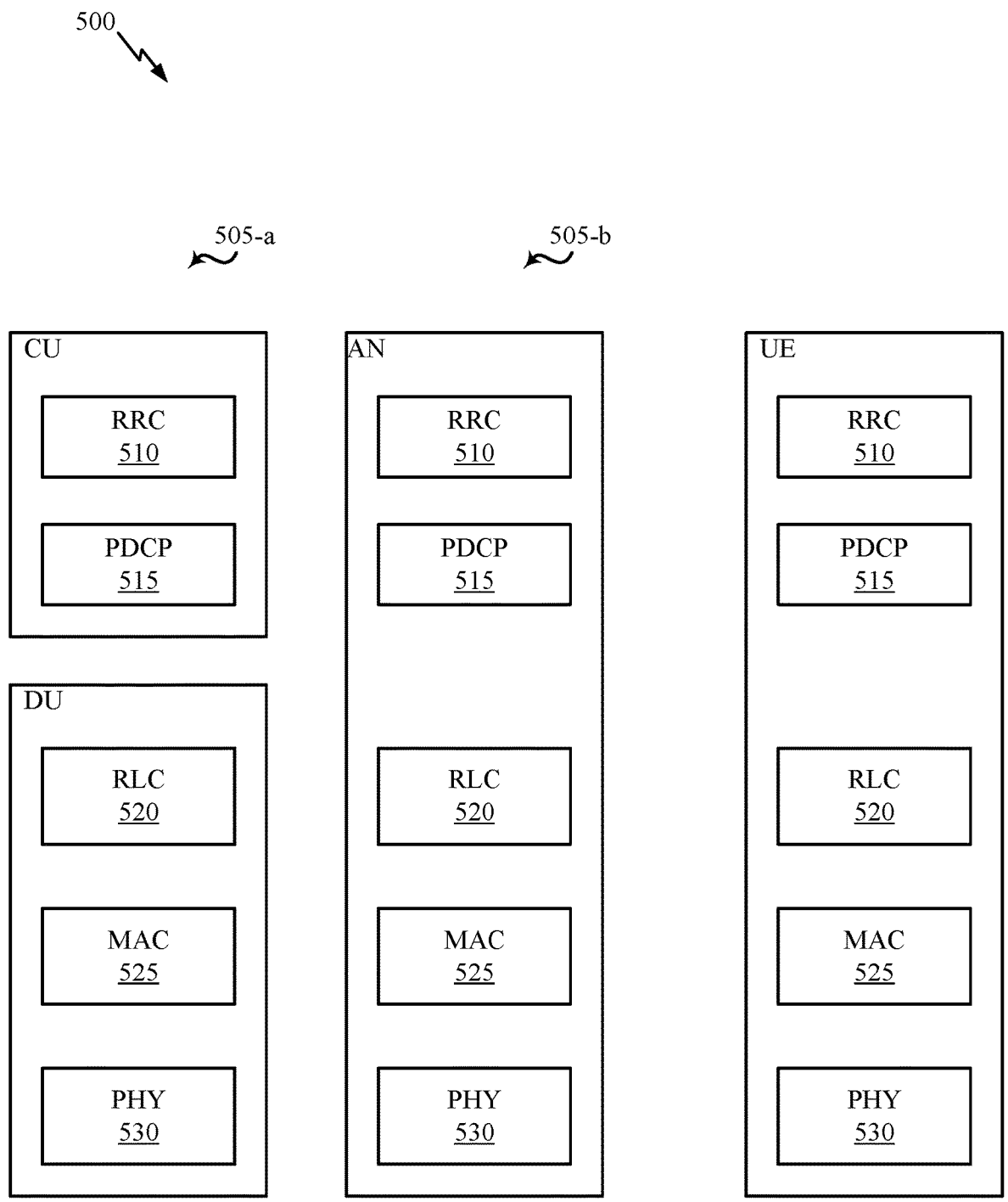
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
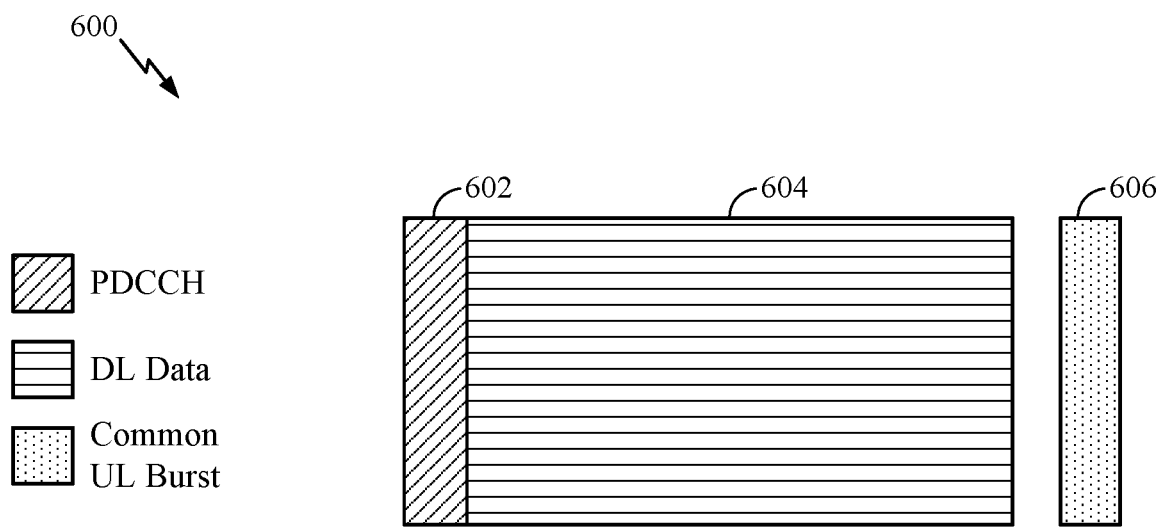
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
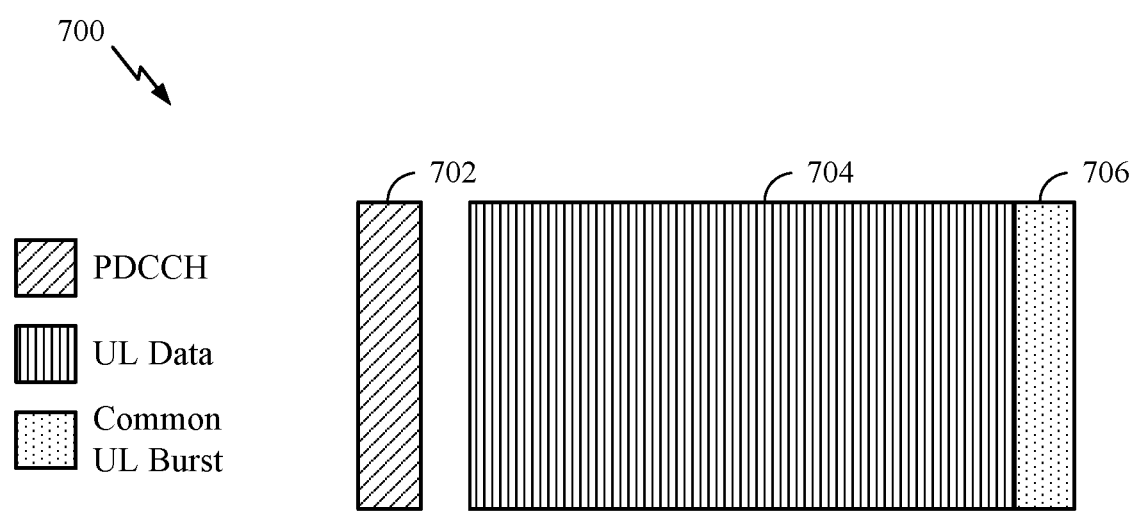
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL data portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

PRECODING REFERENCE SIGNALS FOR UPLINK TRANSMISSIONS WITH DOWNLINK INTERFERENCE INFORMATION

In some cases, a user equipment (UE), conforming to the NR wireless communications standards, may transmit one or more sounding reference signals (SRS) on the uplink to a base station (e.g., gNB) to enable the base station to estimate the uplink channel quality over a portion of the channel bandwidth over which the SRS is transmitted by the UE. Further, the UE may separately transmit information indicative of an estimate of downlink channel quality to the base station. For example, the UE may receive signals (CRS (cell-specific reference signal), CSI-RS (channel state information-reference signal), ZP-CSI-RS (zero-power CSI-RS), etc.) transmitted by the base station on the downlink and compute an estimate of downlink channel quality based on the received signals. The downlink channel quality estimate may include an estimate of the downlink propagation channel and/or the downlink interference. The estimate of the downlink channel quality assists the base station scheduler to properly allocate radio resources to the UEs in the cell.

In certain aspects, a UE may transmit SRS and information indicative of the estimate of downlink channel quality to the base station separately, thereby utilizing resources (e.g., frequency, time, spatial resources) on the uplink for each. However, in order to utilize less resources on the uplink for transmitting SRS and information indicative of the estimate of downlink channel quality to the base station, in certain aspects, the SRS may be coded (e.g., precoded) with information indicative of the estimate of downlink channel quality. The precoded SRS may be transmitted by the UE on the uplink using the same uplink channel resources used to normally transmit SRS. When SRS is precoded with the estimate of the downlink channel quality, additional uplink channel resources are not needed to separately send the estimate of downlink channel quality to the base station. For example, in some cases, the SRS may be used to carry (e.g., coded with) an $R_{nn}$ matrix, which is the interference covariance matrix across receive antennas at the UE based on the signals received by the UE on the downlink. As an example, n may denote a vector of noise and interference at the UE. Accordingly, an $R_{nn}$ matrix may, for example, be derived by the following formula:

$R_{nn} = E\{n\, n^H\}$, where $E\{\ \}$ denotes an expectation operation and $^H$ denotes a Hermitian or conjugate transpose.

In such cases, the Rim matrix may be applied by a pre-coder to the SRS prior to the SRS transmission. Accordingly, in such cases, the base station receives the pre-coded SRS, which the base station may use to calculate downlink precoding of signals for transmission by the base station. A pre-whitened SRS is an example of when a pre-coder applies an operation, such as sqrt(inv($R_{nn}$)), to the SRS, in which case the $R_{nn}$ may first need to be computed over the entire bandwidth over which SRS is transmitted and, then, the square root of the inverse of the $R_{nn}$ may be applied to the SRS sequence. However, pre-whitening the SRS involves an extra level of computational complexity including computing $R_{nn}$ and applying the inverse of $R_{nn}$ to the SRS sequence, which may take time/compute cycles to process.

Accordingly, certain embodiments discussed herein relate to a multi-stage $R_{nn}$ feedback mechanism whereby the UE computes an $R_{nn}$ over only a portion (e.g., subband) of the frequency band (e.g., bandwidth) used for transmitting a SRS transmission. A frequency band used for transmitting SRS is hereinafter referred to as a "SRS frequency band." It should be noted that though certain aspects are discussed with respect to coding or precoding an SRS transmission with a $R_{nn}$ to convey both a reference signal and information indicative of downlink channel estimates from a UE to a base station on the UL, similar techniques can be used to apply information indicative of a channel estimate to a reference signal that is then transmitted by either the UE on the UL, or the base station on the DL.

Figure 8:
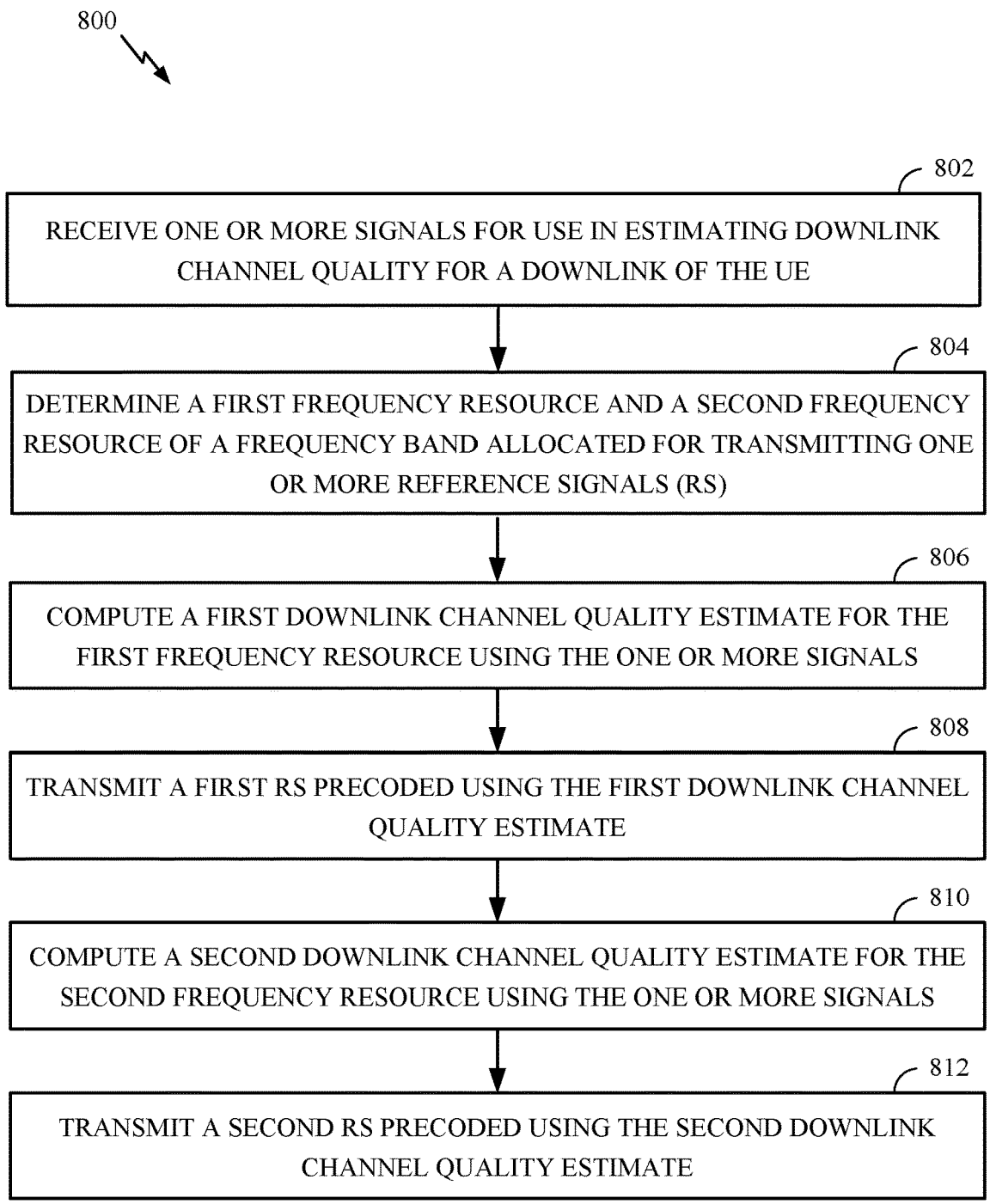
FIG. 8 illustrates example operations of wireless communications for use by a UE, in accordance with certain aspects of the present disclosure.

FIG. 8 illustrates example operations 800 for wireless communications by a wireless device, according to aspects of the present disclosure. The wireless device performing operations 800 may be, for example, a UE. Operations 800 begin, at 802, by receiving (e.g., from a base station) one or more signals (CSR, CSI-RS, ZP-CSI-RS, etc.) for use in estimating downlink channel quality for a downlink of the UE. At 804, operations 800 continue by determining a first frequency resource and a second frequency resource of a frequency band allocated for transmitting one or more reference signals (RS) (e.g., SRS). Here a frequency resource may refer to a subband, a bandwidth part, a group of RBs, a subset of RBs of a subband or a bandwidth part, etc. At 806, operations 800 continue by computing a first downlink channel quality estimate (e.g., interference covariance matrix ($R_{nn}$)) for the first frequency resource using the one or more signals. At 808, operations 800 continue by transmitting a first RS precoded using the first downlink channel quality estimate. At 810, operations 800 continue by computing a second downlink channel quality estimate for the second frequency resource using the one or more signals. At 812, operations 800 continue by transmitting a second RS precoded using the second downlink channel quality estimate.

Figure 8A:
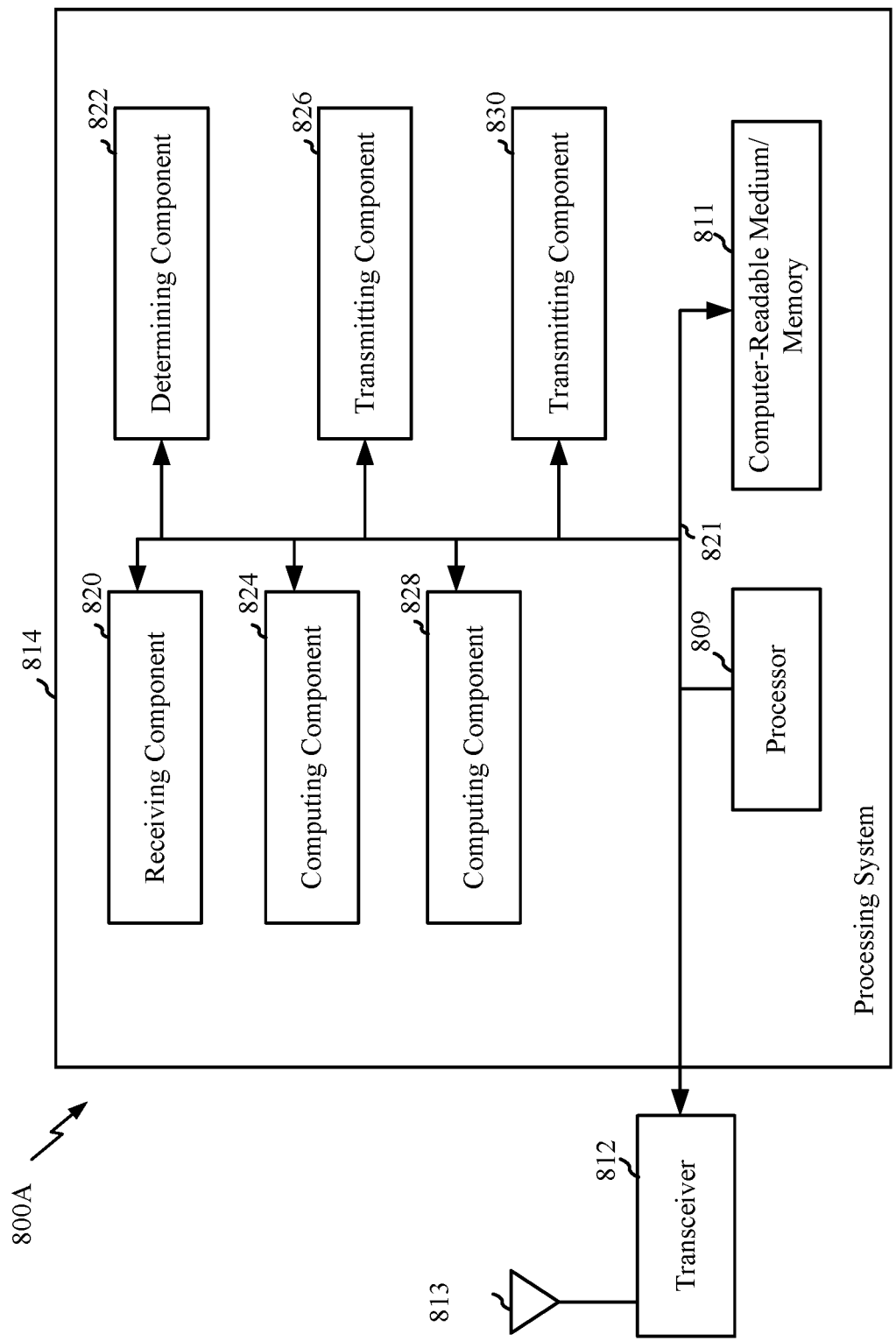
FIG. 8A illustrates a wireless communications device that may include various components configured to perform operations for the techniques disclosed herein, such as one or more of the operations illustrated in FIG. 8.

FIG. 8A illustrates a wireless communications device 800A that may include various components (e.g., corresponding to means-plus-function components) configured to perform operations for the techniques disclosed herein, such as one or more of the operations illustrated in FIG. 8. The communications device 800A includes a processing system 814 coupled to a transceiver 812. The transceiver 812 is configured to transmit and receive signals for the communications device 800A via an antenna 813. The processing system 814 may be configured to perform processing functions for the communications device 800A, such as processing signals, etc.

The processing system 814 includes a processor 809 coupled to a computer-readable medium/memory 811 via a bus 821. In certain aspects, the computer-readable medium/ memory 811 is configured to store instructions that when executed by processor 809, cause the processor 809 to perform one or more of the operations illustrated in FIG. 8, or other operations for performing the various techniques discussed herein.

In certain aspects, the processing system 814 further includes a receiving component 820 for performing one or more of the operations illustrated at 802 in FIG. 8. Additionally, the processing system 814 includes a determining component 822 for performing one or more of the operations illustrated at 804 in FIG. 8. Further, the processing system 814 includes a computing component 824 for performing one or more of the operations illustrated at 806 in FIG. 8. Also, the processing system 814 includes a transmitting component 826 for performing one or more of the operations illustrated at 808 in FIG. 8. Also, the processing system 814 includes a computing component 828 for performing one or more of the operations illustrated at 810 in FIG. 8. Also, the processing system 814 includes a transmitting component 830 for performing one or more of the operations illustrated at 810 in FIG. 8.

The receiving component 820, the determining component 822, the computing component 824, the transmitting component 826, the computing component 828, and the transmitting component 830, may be coupled to the processor 809 via bus 821. In certain aspects, receiving component 820, the determining component 822, the computing component 824, the transmitting component 826, the computing component 828, and the transmitting component 830 may be hardware circuits. In certain aspects, receiving component 820, the determining component 822, the computing component 824, the transmitting component 826, the computing component 828, and the transmitting component 830 may be software components that are executed and run on processor 809.

As described above, in some embodiments, a $R_{nn}$ may be computed only over a portion of the frequency band (e.g., a portion of the resource blocks (RBs), a portion of the bandwidth, etc.) over which SRS is transmitted. As an example, the $R_{nn}$ may be computed for a sub-band, a bandwidth-part, or a group of RBs that is a subset of the RBs used to transmit SRS. In some embodiments, the group of RBs may be a set of contiguous RBs, or a sub-sampling of a set of contiguous RBs (e.g., every first, second, third, etc. RB, resource block group (RBG), or physical resource block group (PRG)).

Since the base station receives a $R_{nn}$ that is computed only over a portion of the SRS frequency band, the base station may not have an accurate estimate of downlink channel quality over the portions of the frequency band for which $R_{nn}$ was not computed and coded into the SRS. However, in certain aspects, the downlink channel quality over one portion of a frequency band may be used as an estimate of the downlink channel quality over another portion of a frequency band. The estimate may be more accurate for portions of a frequency band that are closer in frequency, in certain aspects, or that are known to have similar interference characteristics (e.g., a neighboring base station is known to communicate in the same channel on both portions of the frequency band).

In certain aspects, to further provide more accurate estimates of downlink channel quality over the portions of the frequency band for which $R_{nn}$ was not computed and coded into a first transmitted SRS, in some embodiments, subsequent $R_{nn}$ matrices may be computed for other portions of the frequency band and transmitted to the base station using subsequent SRS transmissions, thereby allowing the base station to eventually receive the $R_{nn}$ for more portions (e.g., all portions) of the SRS frequency. Accordingly, in such embodiments, different pre-whitened SRSs are transmitted at different times using different $R_{nn}$ matrices to precode each SRS, each $R_{nn}$ being computed and corresponding to different portion(s) of the frequency band that is used for transmitting SRS.

Certain embodiments described herein relate to enabling the UE to determine which portions of the SRS frequency band to use to compute the $R_{nn}$ with each SRS transmission. In certain aspects, a UE may be configured (e.g., at the factory, pre-configured, configured over the air, by a message received from a base station, etc.) with and store information indicative of one or more configurations of portions of one or more frequency bands for use in computing $R_{nn}$. For example, the UE may be configured with a configuration that directs the UE to compute $R_{nn}$ for odd RBs, a configuration that directs the UE to compute $R_{nn}$ for even RBs, a configuration that directs the UE to compute $R_{nn}$ for a particular frequency resource, etc.

A base station may be configured to signal which configuration to use to compute $R_{nn}$ and precode SRS using the computed $R_{nn}$. In certain aspects, the base station signals such configuration selection information or the configuration itself in a message (e.g., a command that triggers the SRS transmission (such as downlink control information (DCI) scheduling aperiodic SRS)). In certain aspects, the configuration selection information may include an indicator or identifier associated with the configuration. In certain aspects, the configuration may indicate which portion(s) of the SRS frequency band to transmit at a given time. For example, in some aspects, at different times, SRS may be transmitted in different portions of the frequency band allocated to transmit SRS. In some aspects, the portions of SRS frequency band, indicated in a configuration, nay be the same as the portions of the SRS frequency band used to compute $R_{nn}$.

In some aspects, a configuration may indicate the sequence of frequency resources (e.g., RBs) over which $R_{nn}$ is to be computed. For example, if the allocated SRS frequency bandwidth comprises 10 RBs, the configuration may indicate that the UE may compute the $R_{nn}$ over a set of non-contiguous RBs of the SRS frequency bandwidth (e.g., every other RBs of the 10 RBs of the SRS frequency bandwidth). As another example, the configuration may indicate that the UE may compute the $R_{nn}$ over a contiguous number of RBs in the SRS frequency bandwidth (e.g., the first half of the RBs in the 10 RBs of the SRS frequency bandwidth).

In some embodiments, the sequence of frequency resources (e.g., RBs) over which $R_{nn}$ is computed may be a function of the number of the times SRS is to be transmitted (e.g., number of SRS symbols). For example, if the SRS is transmitted more times, then a finer sweep of the system bandwidth may be possible, such that for one SRS transmission the $R_{nn}$ may be computed over some frequency resources and for the next SRS symbol the $R_{nn}$ may be computed over some other frequency resources. In certain aspects, all frequency resources of the frequency band allocated for transmitting SRS are used to compute $R_{nn}$ over the course of all of the SRS symbols.

In some embodiments, the sequence and portions of the system bandwidth over which $R_{nn}$ is computed may be a function of the SRS bandwidth, i.e., the bandwidth of the frequency band allocated for transmitting SRS. For example, if the SRS frequency bandwidth is a narrowband, then $R_{nn}$ may be computed over all the RBs of the SRS narrowband, in which case the $R_{nn}$ bandwidth used for computing $R_{nn}$ equals the SRS frequency bandwidth. However, if the SRS frequency bandwidth is a wideband, then $R_{nn}$ may be computed over only a subset or subsampling of the RBs within the SRS frequency wideband, in which case the Rim bandwidth is as large as only a fraction of the SRS frequency bandwidth.

In some embodiments, the sequence and portions of the SRS frequency band over which $R_{nn}$ is computed may be a function of timing (e.g., the amount of time the UE has to perform $R_{nn}$ computations) and/or the capabilities of the UE. For example, in some embodiments, the UE may be triggered to transmit SRS at a certain point in time either due to a periodic SRS configuration or a signaling command including DCI for scheduling aperiodic SRS. At some point between when the UE is triggered to transmit the SRS and when it is actually scheduled to transmit the SRS, the UE may receive signals, such as CSR, CSI-RS, ZP-CSI-RS, etc., which the UE may use to estimate $R_{nn}$.

Accordingly, the UE may perform its $R_{nn}$ computations from the time it receives these signals to when it transmits SRS. It is during this time period when, in some embodiments, the UE determines which portion of the SRS frequency band to select to perform $R_{nn}$ computations for the scheduled SRS. In some embodiments, during the same time period, the UE may also determine a subsequent portion of the SRS frequency band to perform $R_{nn}$ computations for the next scheduled SRS transmission (e.g., SRS that is transmitted in a subsequent subframe). In some embodiments, the determination about which subsequent portion of the SRS frequency band to use for performing $R_{nn}$ computations may be performed after the first scheduled SRS transmission.

As described above, in embodiments where little time is available to complete the $R_{nn}$ computations that are needed before transmitting the SRS, the UE may simplify the computations by estimating $R_{nn}$ over a smaller bandwidth. As an example, in some embodiments, there may not even be enough time for performing any $R_{nn}$ computations, in which case the SRS that is transmitted may not be coded with $R_{nn}$ and $R_{nn}$ may be transmitted separately. However, when relatively more time is available for performing $R_{nn}$ computations, the $R_{nn}$ may be computed over a larger bandwidth. In addition, in some embodiments, the amount of time that a UE needs to perform $R_{nn}$ computations may depend on the capabilities of the UE. If the UE is able to compute $R_{nn}$ within a very short time span, then $R_{nn}$ computations may be performed in cases where a less capable UE would not have performed such computations.

In some embodiments, the amount of time that the UE has to perform $R_{nn}$ computations (e.g., the amount of time starting from when the UE receives signals (e.g., CRS etc.) to when it transmits SRS) may be configured or selected dynamically from among a set of configured relations as part of the same trigger that causes the SRS transmission.

In some embodiments, when the UE is triggered to transmit the SRS at a certain point in time and over a certain bandwidth, the UE may only transmit the SRS in frequency resources (e.g., RBs) for which $R_{nn}$ has been computed by the UE. For example, the SRS may be scheduled to be transmitted over a span of 10 RBs while $R_{nn}$ may only be computed by the UE for the first half of those RBs (e.g., the first 5 RBs of those 10 RBs). In such an example, the SRS may also only be transmitted over the first half of the RBs. Also, in such an example, during a subsequent SRS scheduled transmission, the SRS may be transmitted over the second half of those 10 RBs, for which the UE is able to compute the $R_{nn}$ as well. Such a partitioning of the SRS bandwidth may depend on the configuration of the downlink reference signal (DL RS) used to estimate downlink channel and interference (e.g., CSI-RS or ZP-CSI-RS), e.g., may depend on or correspond to a similar bandwidth-based split in the CSI-RS transmission.

In some embodiments, different $R_{nn}$ matrices may be used for precoding different parts of the SRS bandwidth. For example, different frequency resources (e.g., RBs) of the SRS frequency bandwidth may be coded with a $R_{nn}$ computed for that frequency resource or a different frequency resource. In certain aspects, this may negatively impact the low-peak-to-average-power (low-PAPR) property of the SRS waveform. However, in certain aspects, UEs that are not near the cell-edge may be configured to use different $R_{nn}$ matrices for coding different parts of the SRS frequency bandwidth as low peak-to-average power ration (low-PAPR) may not be as important, while in certain aspects, UEs near the cell edge may apply the same $R_{nn}$ matrices for coding all parts of the SRS frequency bandwidth transmitted. It is important to note that all the embodiments described above in relation to limiting the number of RBs over which Rim is computed may be applied to embodiments where different matrices are used for precoding different parts of the SRS bandwidth.

Accordingly, using a multi-stage $R_{nn}$ feedback, as described above in the embodiments above, reduces the computation complexity involved in computing the $R_{nn}$ and, therefore, the amount of time and computer resources required to compute the $R_{nn}$.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications for use by a user equipment (UE), comprising:
   receiving, from a base station, one or more signals for use in estimating channel quality for a downlink between the base station and the UE; and
   transmitting a first reference signal (RS) precoded with a first downlink channel quality estimate, wherein:
      the first RS comprises the first downlink channel quality estimate,
      the first downlink channel quality estimate is based on a first frequency resource of the one or more signals, and
      a frequency band allocated for RS transmission includes the first frequency resource.

2. The method of claim 1, further comprising:
   transmitting a second reference signal (RS) precoded with a second downlink channel quality estimate, wherein:
      the second RS comprises the second downlink channel quality estimate,
      the second downlink channel quality estimate is based on a second frequency resource of the one or more signals, and
      the frequency band allocated for RS transmission includes the second frequency resource.

3. The method of claim 2, wherein the first downlink channel quality estimate comprises a first interference covariance matrix ($R_{nn}$) and the second downlink channel quality estimate comprises a second $RR_{nn}$, and wherein the first RS comprises a first sounding reference signal (SRS) and the second RS comprises a second SRS.

4. The method of claim 2, wherein the first frequency resource and the second frequency resource are determined based on a message received from the base station for triggering the UE to perform a RS transmission.

5. The method of claim 4, wherein the message comprises downlink control information for sounding reference signal (SRS) scheduling.

6. The method of claim 4, wherein the message identifies one of a plurality of configurations, each configuration corresponding to a different set of frequency resources.

7. The method of claim 2, wherein the first frequency resource and the second frequency resource are determined based on a range of the frequency band allocated for RS transmission.

8. The method of claim 2, wherein the first frequency resource and the second frequency resource are determined based on capabilities of the UE.

9. The method of claim 2, wherein the first frequency resource and the second frequency resource are determined based on time available between events of receiving a message indicating transmission of RS, receiving the one or more signals for use in estimating the channel quality, and transmitting the first RS.

10. The method of claim 1, wherein the frequency band allocated for RS transmission comprises resource blocks (RBs).

11. The method of claim 1, wherein:
transmitting the first RS comprises transmitting the first RS over all frequency resources of the frequency band; and
the first frequency resource corresponds to all frequency resources of the frequency band.

12. The method of claim 1, wherein:
transmitting the first RS comprises transmitting the first RS over all frequency resources of the frequency band at a first time; and
the first frequency resource corresponds to a first subset of the frequency resources of the frequency band.

13. The method of claim 12, further comprising:
transmitting a second RS precoded with a second downlink channel quality estimate, wherein:
the second RS comprises the second downlink channel quality estimate,
the second downlink channel quality estimate is based on a second frequency resource of the one or more signals,
the frequency band allocated for RS transmission includes the second frequency resource,
transmitting the second RS comprises transmitting the second RS over all the frequency resources of the frequency band at a second time, and
the second frequency resource corresponds to a second subset of the frequency resources of the frequency band.

14. The method of claim 1, wherein:
transmitting the first RS comprises transmitting the first RS over the first frequency resource; and
the first frequency resource corresponds to a first subset of the frequency resources of the frequency band.

15. The method of claim 14, further comprising:
transmitting a second RS precoded with a second downlink channel quality estimate, wherein:
the second RS comprises the second downlink channel quality estimate,
the second downlink channel quality estimate is based on a second frequency resource of the one or more signals,
the frequency band allocated for RS transmission includes the second frequency resource,
transmitting the second RS comprises transmitting the second RS the second frequency resource, and
the second frequency resource corresponds to a second subset of the frequency resources of the frequency band.

16. A user equipment (UE), comprising:
a memory; and
a processor coupled to the memory, the processor and the memory are configured to:
receive, from a base station, one or more signals for use in estimating channel quality for a downlink between the base station and the UE; and
transmit a first reference signal (RS) precoded with a first downlink channel quality estimate, wherein:
the first RS comprises the first downlink channel quality estimate,
the first downlink channel quality estimate is based on a first frequency resource of the one or more signals, and
a frequency band allocated for RS transmission includes the first frequency resource.

17. The UE of claim 16, wherein the memory and the processor are further configured to:
transmit a second reference signal (RS) precoded with a second downlink channel quality estimate, wherein:
the second RS comprises the second downlink channel quality estimate,
the second downlink channel quality estimate is based on a second frequency resource of the one or more signals, and
the frequency band allocated for RS transmission includes the second frequency resource.

18. The UE of claim 17, wherein the first downlink channel quality estimate comprises a first interference covariance matrix ($R_{nn}$) and the second downlink channel quality estimate comprises a second $R_{nn}$, and wherein the first RS comprises a first sounding reference signal (SRS) and the second RS comprises a second SRS.

19. The UE of claim 17, wherein the first frequency resource and the second frequency resource are determined based on a message received from the base station for triggering the UE to perform a RS transmission.

20. The UE of claim 19, wherein the message comprises downlink control information for sounding reference signal (SRS) scheduling.

21. The UE of claim 19, wherein the message identifies one of a plurality of configurations, each configuration corresponding to a different set of frequency resources.

22. The UE of claim 17, wherein the first frequency resource and the second frequency resource are determined based on a range of the frequency band allocated for RS transmission.

23. The UE of claim 17, wherein the first frequency resource and the second frequency resource are determined based on capabilities of the UE.

24. The UE of claim 17, wherein the first frequency resource and the second frequency resource are determined based on time available between events of receiving a message indicating transmission of RS, receiving the one or more signals for use in estimating the channel quality, and transmitting the first RS.

25. The UE of claim 16, wherein the frequency band allocated for RS transmission comprises resource blocks (RBs).

26. The UE of claim 16, wherein:
the processor and the memory being configured to transmit the first RS comprises the processor and the memory being configured to transmit the first RS over all frequency resources of the frequency band; and
the first frequency resource corresponds to all frequency resources of the frequency band.

27. The UE of claim 16, wherein:
the processor and the memory being configured to transmit the first RS comprises the processor and the memory being configured to transmit the first RS over all frequency resources of the frequency band at a first time; and
the first frequency resource corresponds to a first subset of the frequency resources of the frequency band.

28. The UE of claim 27, wherein the processor and the memory are further configured:
transmit a second RS precoded with a second downlink channel quality estimate, wherein:
the second RS comprises the second downlink channel quality estimate,
the second downlink channel quality estimate is based on a second frequency resource of the one or more signals,
the frequency band allocated for RS transmission includes the second frequency resource,
the processor and the memory being configured to transmit the second RS comprises the processor and the memory being configured to transmit the second RS over all the frequency resources of the frequency band at a second time, and
the second frequency resource corresponds to a second subset of the frequency resources of the frequency band.

29. The UE of claim 16, wherein:
the processor and the memory being configured to transmit the first RS comprises the processor and the memory being configured to transmit the first RS over the first frequency resource; and
the first frequency resource corresponds to a first subset of the frequency resources of the frequency band.

30. The UE of claim 29, wherein the processor and the memory are further configured to:
transmit a second RS precoded with a second downlink channel quality estimate, wherein:
the second RS comprises the second downlink channel quality estimate,
the second downlink channel quality estimate is based on a second frequency resource of the one or more signals,
the frequency band allocated for RS transmission includes the second frequency resource,
the processor and the memory being configured to transmit the second RS comprises the processor and the memory being configured to transmit the second RS the second frequency resource, and
the second frequency resource corresponds to a second subset of the frequency resources of the frequency band.

* * * * *